(12) United States Patent
Boriani et al.

(10) Patent No.: US 7,452,179 B2
(45) Date of Patent: Nov. 18, 2008

(54) METHOD AND DEVICE FOR TRANSFERRING AND SEPARATING A STREAM OF STACKED PACKETS

(75) Inventors: Silvano Boriani, Bologna (IT); Stefano Negrini, Calderara Di Reno (IT)

(73) Assignee: G.D Societa' per Azioni, Bologna (IT)

( * ) Notice: Subject to any disclaimer, the term of this patent is extended or adjusted under 35 U.S.C. 154(b) by 355 days.

(21) Appl. No.: 11/030,723

(22) Filed: Jan. 6, 2005

(65) Prior Publication Data
US 2005/0169740 A1 Aug. 4, 2005

(30) Foreign Application Priority Data
Jan. 13, 2004 (IT) .......................... BO2004A0013

(51) Int. Cl.
*B65G 59/02* (2006.01)
*B65G 57/00* (2006.01)

(52) U.S. Cl. ................. 414/801; 414/796.8; 414/796.9; 414/796.2; 198/436

(58) Field of Classification Search ................. 198/448, 198/451, 483.1, 610, 468.4, 436, 442; 53/442, 53/557, 73; 221/94; 414/788.7, 797.2, 795.9, 414/796.2, 796.5, 796.7, 796.9, 797, 797.1, 414/797.6, 797.8, 797.9, 796.6, 796.8; 29/239
See application file for complete search history.

(56) References Cited

U.S. PATENT DOCUMENTS

| | | | | |
|---|---|---|---|---|
| 2,277,408 A | * | 3/1942 | Molins et al. .................. 53/73 |
| 3,866,883 A | * | 2/1975 | Goransson ................ 254/93 R |
| 5,462,401 A | * | 10/1995 | Brizzi et al. ................ 414/797 |
| 5,803,702 A | * | 9/1998 | Mullins et al. ........... 414/788.7 |
| 6,629,812 B1 | * | 10/2003 | Lee et al. ................ 414/788.8 |

FOREIGN PATENT DOCUMENTS

| EP | 0 816 263 | 1/1998 |
|---|---|---|
| FR | 1 315 691 | 1/1963 |

\* cited by examiner

*Primary Examiner*—Saul J Rodriguez
*Assistant Examiner*—Gregory W Adams
(74) *Attorney, Agent, or Firm*—Ladas & Parry LLP

(57) ABSTRACT

A method and device for transferring packets, whereby two parallel, superimposed rows of packets are fed in a horizontal direction to a first transfer station, and the lead packets in the two rows are then conveyed in a vertical direction from the first transfer station to a second transfer station, where the lead packets are parted in the vertical direction; at this point, the parted lead packets are transferred in the horizontal direction to a heat-shrink unit having two parallel, superimposed, substantially horizontal channels, each of which is engaged by a respective row of packets.

3 Claims, 3 Drawing Sheets

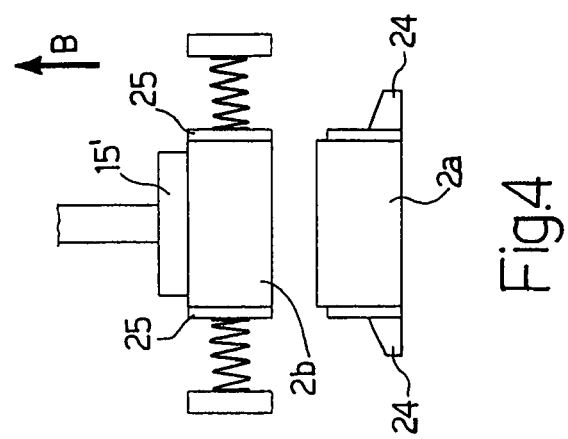
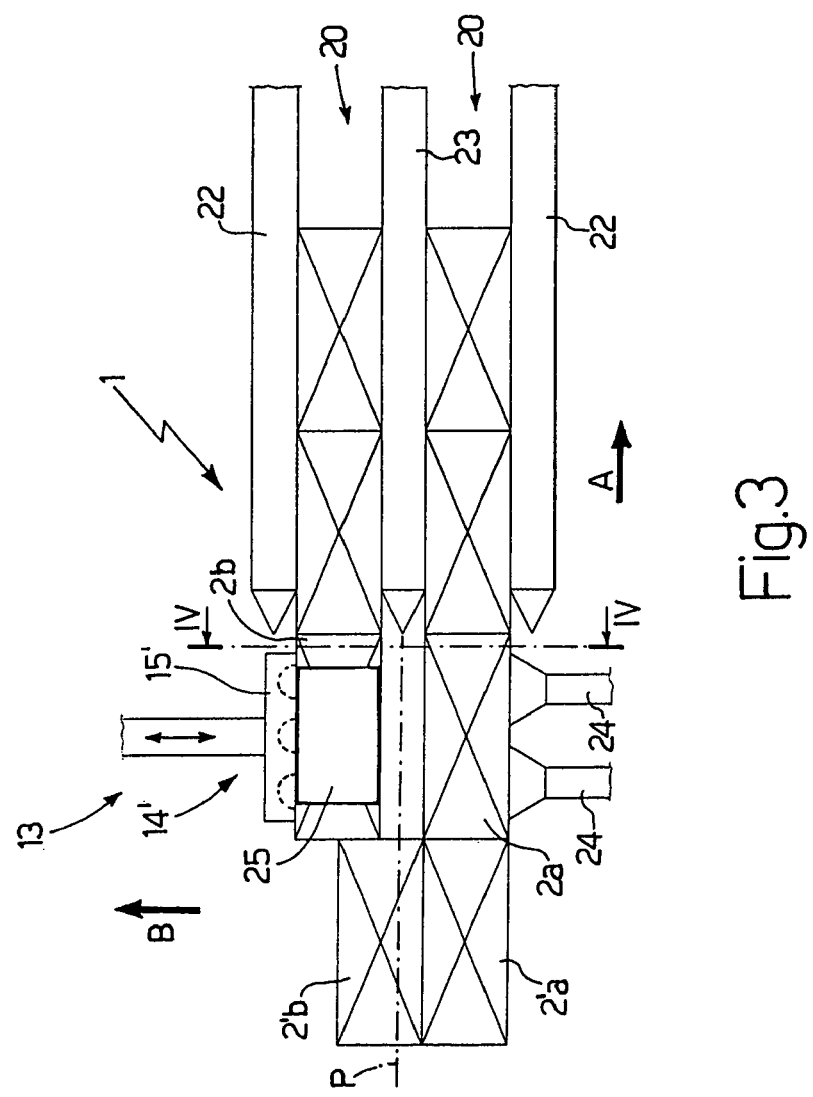
Fig.3
Fig.4

METHOD AND DEVICE FOR TRANSFERRING AND SEPARATING A STREAM OF STACKED PACKETS

The present invention relates to a method and device for transferring packets.

The present invention may be used to advantage in cigarette packing, to which the following description refers purely by way of example.

BACKGROUND OF THE INVENTION

In cigarette packing, two superimposed, parallel rows of packets of cigarettes are fed to a cartoning machine for producing packages or cartons, each containing a group of two superimposed rows of packets of cigarettes; and, upstream from the cartoning machine, the packets of cigarettes fed to the cartoning machine are normally fed through one or more operating units (typically for heat-shrinking the plastic overwrapping of the packets of cigarettes), one of which usually comprises two parallel, feed channels separated by partition members and each engaged by a respective row of packets.

Transferring the rows of packets to the feed channels is a highly delicate operation, during which the two rows of packets may shift out of line, thus creating processing problems downstream from the operating unit, and/or the packets may undergo damage caused by improper insertion inside the channels.

SUMMARY OF THE INVENTION

It is an object of the present invention to provide a method and device for transferring packets, designed to eliminate the aforementioned drawbacks, and which, at the same time, are cheap and easy to implement.

According to the present invention, there is provided a method of transferring packets, as claimed in the attached claims.

According to the present invention, there is also provided a device for transferring packets, as claimed in the attached claims.

BRIEF DESCRIPTION OF THE DRAWINGS

A number of non-limiting embodiments of the present invention will be described by way of example with reference to the accompanying drawings, in which:

FIG. 3 shows a schematic side view of a further embodiment of a device in accordance with the present invention;

FIG. 4 shows a section along line IV-IV of a detail of the FIG. 3 device.

DETAILED DESCRIPTION OF THE INVENTION

Figure 1:
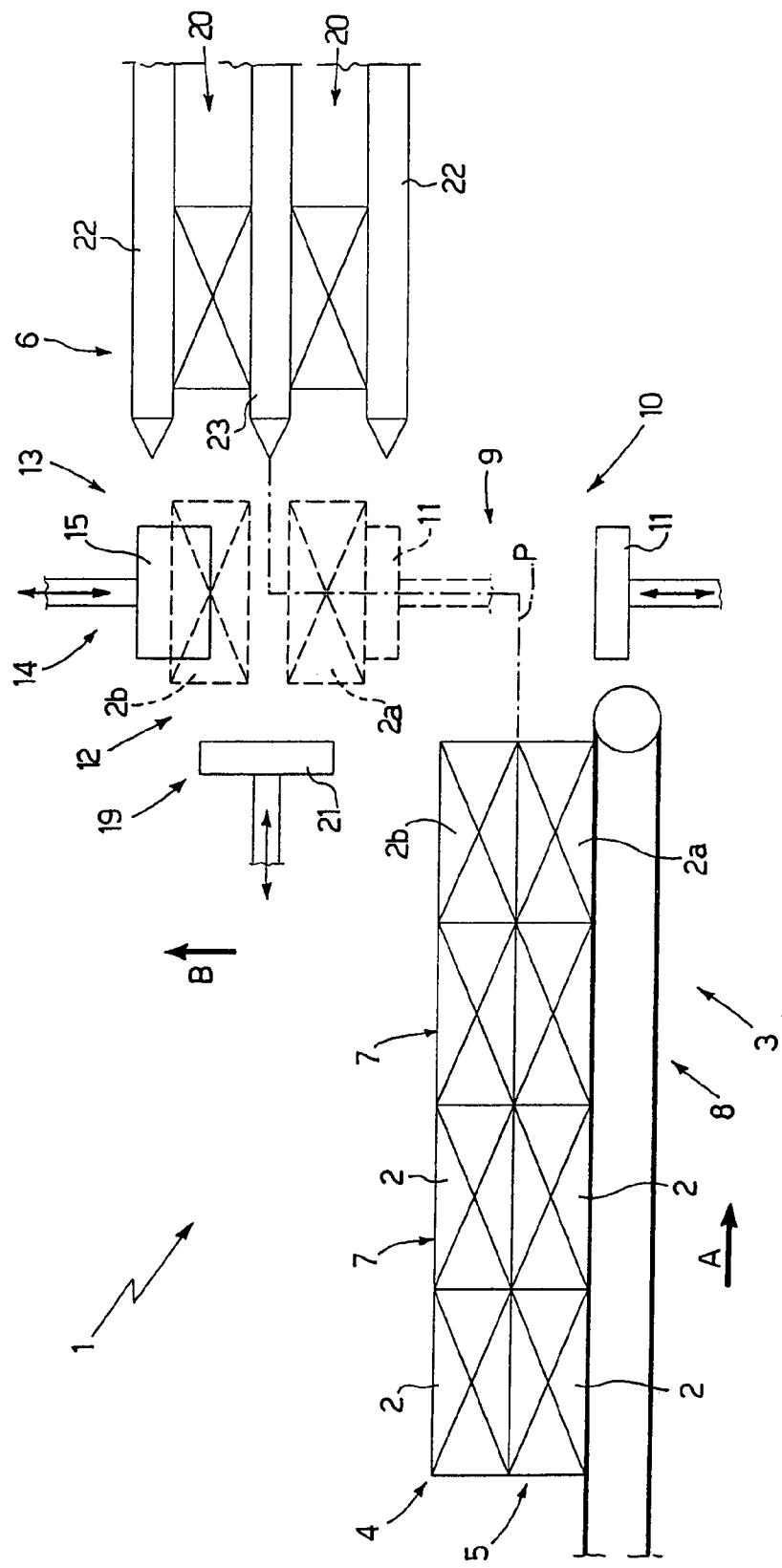
FIG. 1 shows a schematic side view of a device in accordance with the present invention.
Figure 2:
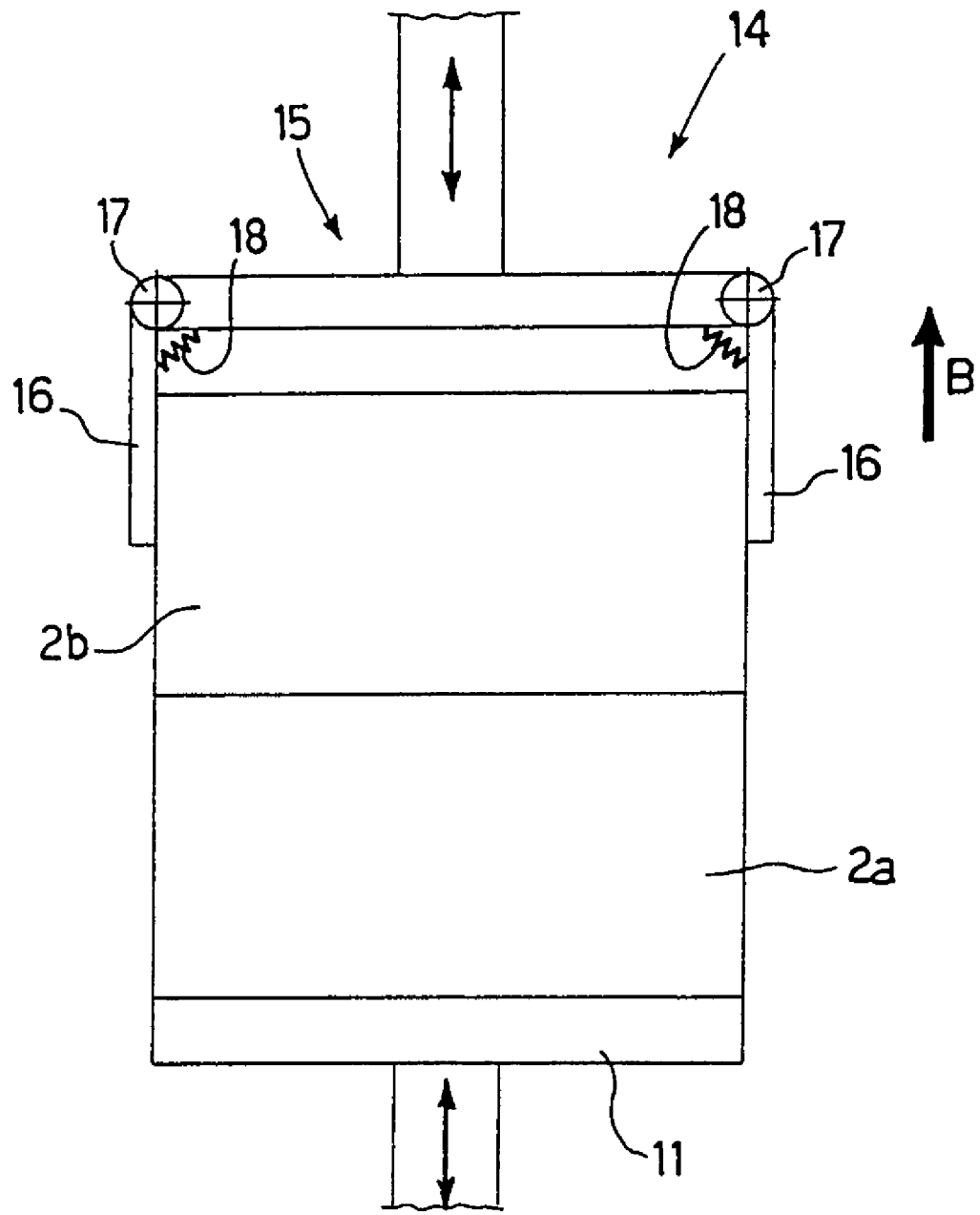
FIG. 2 shows a front view of a detail in FIG. 1.

Number 1 in FIG. 1 indicates as a whole a device for transferring packets 2 of cigarettes (not shown), and which comprises a conveyor assembly 3 for conveying two rows 4 and 5 of packets 2 along a feed path P to an operating unit 6.

Packets 2 are each wrapped in a respective overwrapping 7 of heat-shrink material, e.g. cellophane; and unit 6 heat-shrinks overwrappings 7 of heat-shrink material, and is located upstream from a known machine (not shown) for producing cartons (not shown) of packets 2.

Conveyor assembly 3 comprises a transfer unit 8 for feeding rows 4 and 5, parallel to each other and in a given substantially horizontal direction A, to a transfer station 9; transfer unit 8 comprises a belt conveyor; and rows 4 and 5 are arranged, at transfer unit 8, one underneath the other and directly contacting each other.

Conveyor assembly 3 also comprises a transfer unit 10 having a pusher 11 and a known actuator (not shown) for moving pusher 11 vertically. In actual use, as it moves up, pusher 11 intercepts and pushes a packet 2a in row 4 upwards in a given substantially vertical direction B to a transfer station 12 located immediately upstream from unit 6 along path P; and, as it is pushed upwards, packet 2a lifts up an end packet 2b in row 5.

A parting assembly 13 at transfer station 12 parts packets 2a and 2b in direction B, and comprises a positioning unit 14, which positions packet 2b correctly at transfer station 12, and in turn comprises a gripping head 15. Gripping head 15 comprises two gripping members 16, each of which is movable about a respective substantially horizontal hinge 17 and is held in position by a respective elastic member 18. Positioning unit 14 also comprises a known actuator (not shown) for moving gripping head 15 in direction B.

In an alternative embodiment not shown, gripping head 15 comprises suction cups.

In actual use, as packet 2b is fed to transfer station 12, members 16 engage the lateral walls of packet 2b so that packet 2b is gripped by gripping head 15, which is then raised in direction B to detach packet 2b from packet 2a.

In an alternative embodiment, gripping head 15 is fixed, and, in use, once packet 2b is gripped by gripping head 15, pusher 11 is lowered to detach packet 2a from packet 2b.

Conveyor assembly 3 also comprises a transfer unit 19 for transferring the parted packets 2a and 2b, in direction A, from transfer station 12 to respective feed channels 20 of unit 6, and which comprises a pusher 21, and a known actuator (not shown) for moving pusher 21 in direction A.

Unit 6 comprises two conveyors 22 for conveying respective rows 4 and 5 along channels 20, which are substantially horizontal and separated by a partition member 23. Conveyors 22 and partition member 23 each comprise known heating plates (not shown) for heating packets 2 and so shrinking overwrappings 7 about packets 2.

FIGS. 3 and 4 show an alternative embodiment of device 1, which comprises a known transfer unit (not shown) for conveying packets 2a and 2b, in direction A, along path P to transfer station 12 located upstream from unit 6.

Parting assembly 13 comprises a positioning unit 14' located at transfer station 12 and in turn comprising a suction gripping head 15', and a known actuator (not shown) for moving gripping head 15' in direction B. Parting assembly 13 also comprises retaining members 24 for retaining packet 2a when, in use, packet 2b is gripped and raised by gripping head 15'; and elastic gripping members 25 located on opposite sides of gripping head 15', and which engage the lateral walls of packet 2b to clamp packet 2b in a given position. In certain embodiments, retaining members 24 comprise suction devices.

Once packets 2a and 2b are parted, the packets 2'a and 2'b immediately upstream from packets 2a and 2b push packets 2a and 2b in direction B to unit 6.

Though the above description and the accompanying drawings refer to transferring packets of cigarettes, the teachings of the present invention also apply to transferring packets of other than cigarettes, such as packets of food products, confectionary, or toiletries.

The invention claimed is:

1. A method of transferring packets, the method comprising the steps of:

conveying a first row (4) of packets (2) and at least a second row (5) of packets (2), to the first row (4), along a feed path (P) to an operating unit (6) having at least one pair of channels (20);

conveying the first and the second rows (4, 5), parallel to and in contact with each other, in a given first direction (A), along the feed path (P) to a second transfer station (9); and inserting each row (4, 5) inside a respective channel (20) of the operating unit (6) by transferring the rows (4, 5) in the first direction (A);

the method further comprising the steps of:

feeding at least one lead packet (2a) of the first row (4) and at least one lead packet (2b) of the second row (5) from the second transfer station (9) to a first transfer station (12) located upstream from the operating unit (6) along the feed path (P); the lead packet (2a) in the first row (4) being pushed and, in turn, pushing the lead packet (2b) in the second row (5) upwards in a second direction (B), which is substantially vertical and crosswise to the first direction (A);

parting the lead packets (2a, 2b) at the first transfer station (12) crosswise to the first direction (A); positioning means (14), located at the first transfer station (12), gripping the lead packet (2b) of the second row (5) and then the lead packet (2a) of the first row (4) being moved vertically downwards to detach itself from the lead packet (2b) in the second row (5); and transferring, after the lead packets (2a, 2b) have been parted, each lead packet (2a, 2b) in the first direction (A) into the respective channel (20) of the operating unit (6).

2. A method as claimed in claim 1, wherein second push means (21), which are located at the first transfer station (12), convey each lead packet (2a, 2b) in the first direction (A), to the respective channel (20) of the operating unit (6).

3. A method as claimed in claim 1, wherein, as the lead packets (2a, 2b) are fed to the first transfer station (12), the lead packet (2a) in the first row (4) and the lead packet (2b) in the second row (5) are conveyed in the first direction (A).

* * * * *